United States Patent

Toews et al.

[11] Patent Number: 5,785,300
[45] Date of Patent: Jul. 28, 1998

[54] DEVICE FOR PROVIDING A UNIFORMLY-VARIABLE ANNULAR ORIFICE

[75] Inventors: Hans G. Toews, East Aurora; James F. van Oss, Buffalo, both of N.Y.

[73] Assignee: Moog Inc., East Aurora, N.Y.

[21] Appl. No.: 610,214

[22] Filed: Mar. 4, 1996

[51] Int. Cl.$^6$ ............................................. F16K 31/00
[52] U.S. Cl. ............................................. 251/342; 251/4
[58] Field of Search ................................. 251/4, 342

[56] References Cited

U.S. PATENT DOCUMENTS

| | | | |
|---|---|---|---|
| 2,518,165 | 8/1950 | Millard | 251/342 |
| 2,692,751 | 10/1954 | Felver | 251/342 |
| 2,835,272 | 5/1958 | Taupin | 251/4 |
| 2,946,555 | 7/1960 | Cantor | 251/342 |
| 4,056,116 | 11/1977 | Carter et al. | 251/342 |
| 5,060,833 | 10/1991 | Edison et al. | 251/342 |

FOREIGN PATENT DOCUMENTS 897567  5/1944  France ................................. 251/342

*Primary Examiner*—A. Michael Chambers
*Attorney, Agent, or Firm*—Phillips, Lytle, Hitchcock, Blaine & Huber LLP

[57] ABSTRACT

A device (20) for providing a uniformly-variable orifice includes an object (21) having an outer surface, a wall (24) surrounding the object in spaced relation to the outer surface and defining an annular orifice therebetween; and deforming means ($F_1$) for causing at least one of the surface and wall to move perpendicularly and uniformly toward the other of the surface and wall without substantially altering the geometric shape of the annular orifice, whereby the movable member may be moved relative to the other to vary the area of the orifice. In the preferred embodiment, the area of the orifice varies substantially linearly with application of the deforming displacement.

9 Claims, 1 Drawing Sheet

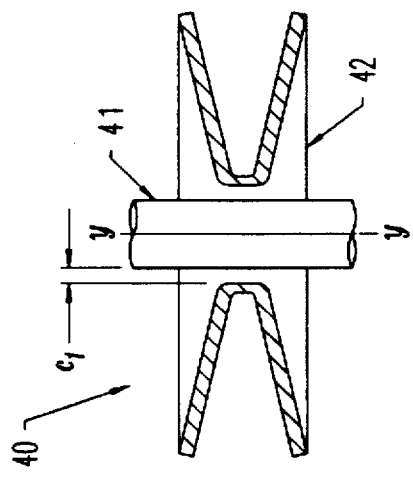
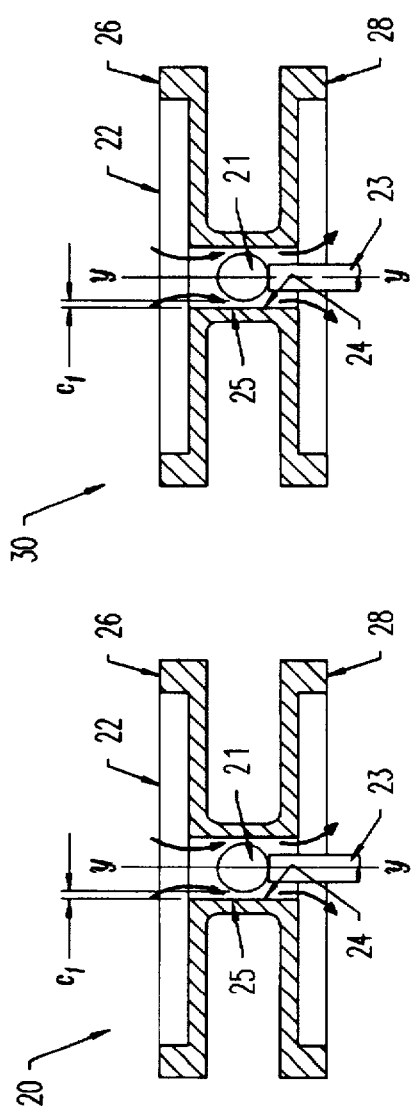
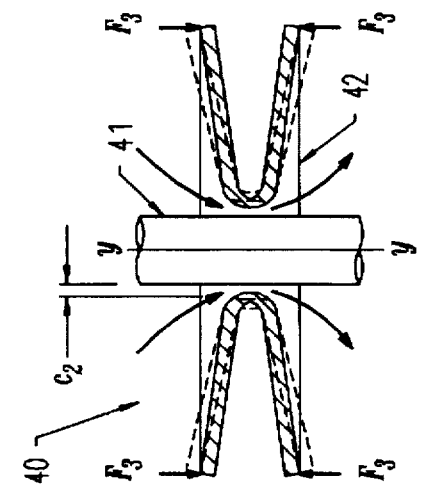
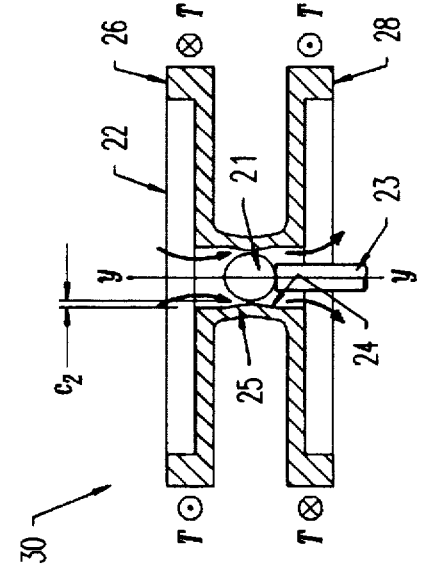
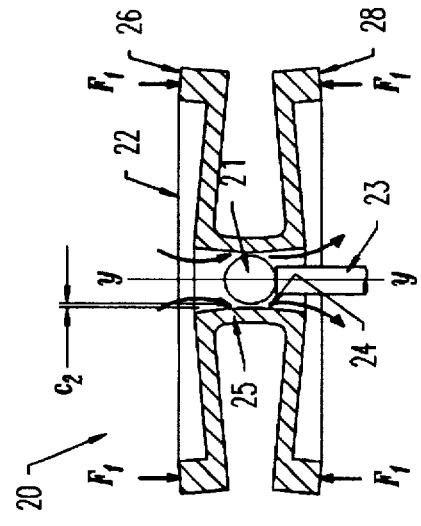

1

DEVICE FOR PROVIDING A UNIFORMLY-VARIABLE ANNULAR ORIFICE

TECHNICAL FIELD

The present invention relates generally to the field of orifices and flow restrictions having very small openings, and, more particularly, to an improved device for providing a mechanically-adjustable and precisely-variable annular orifice having an extremely-small flow passage.

BACKGROUND ART

In controlling the flow of fuel to an electric propulsion ion engine for a space vehicle, it is necessary to continuously and precisely maintain the adjustment of an extremely-small metering orifice.

A well known implementation of a precise metering orifice is the needle valve, in which a very narrow angle tapered needle is mounted for movement toward and away from a circular seat, thus providing a variable-area annular orifice therebetween. However, the flows required for ion engine control are so small as to exceed the practical capability of even this device.

It is known to provide a variable-area orifice by positioning a rigid spherical ball within a closely-fitting round passage, or by associating the ball with a seat, and to thereafter elastically deform the housing or seat to modulate flow. Application of an appropriate force, usually a squeeze or stretch on a transverse diametrical axis of the housing, produces an elliptical opening on the movable member, and forms diametrically-opposite enlarged crescent-shaped flow channels on opposite sides of the ball. In this type of device, the orifice area varies as a function of the applied mechanical deformation. However, the gain of the device is non-linear in the sense that the orifice area does not vary proportionally with the supplied deforming input. Examples of this type of variable orifice may be found in U.S. Pat. Nos. 2,518,165, 2,946,555, 3,758,073, 4,456,223 and 4,730,634.

Another type of device utilizing elastic deformation of a flow passage provides an elongated tubular member that may be elastically twisted about its axis to reduce its inner diameter. Examples of this type of device may be found in U.S. Pat. Nos. 2,844,351, 3,329,390 and 4,523,737. However, none of these devices provides an inner member within the outer deformable member to create a variable annular opening therebetween.

Each of the foregoing types of mechanically-variable orifices has its own individual shortcomings. It would, therefore, be generally desirable to provide an improved mechanically-adjustable device in which the orifice area varies substantially proportionally with a supplied mechanical displacement.

DISCLOSURE OF THE INVENTION

The present invention broadly provides an improved device that affords a variable orifice, the area of which may be modulated as a substantially-linear function of a supplied mechanical displacement.

With parenthetical reference to the corresponding parts, portions or surfaces of the first form the invention, as shown in FIGS. 1 and 2, merely for purposes of illustration and not by way of limitation, the improved device (20) includes: an object (21) having an outer surface; a wall (24) surrounding the object in closely spaced relation to the outer surface and defining an orifice opening therebetween; and means for causing one of the surface and wall to move elastically and perpendicularly toward or away from the other of said surface and wall so as to uniformly change the spacing therebetween without substantially altering the initial geometric shape of said orifice opening; whereby the movable one of the surface and wall may be moved perpendicularly relative to the other of the surface and wall to vary the area of the orifice.

In the preferred embodiment, the wall is configured as a surface of revolution generated about the axis of the orifice. The outer surface of the object is preferably configured as a surface of revolution generated about at least one point on the orifice axis. The object may be a ball (21), and the outer surface may be substantially spherical. Alternatively, the object may be a rod (41), and the outer surface may be substantially cylindrical. The object may have other configurations as well.

In the preferred embodiment, the radial clearance between the object outer surface and the wall varies substantially proportionally and substantially uniformly about the periphery of the object when the movable one of the surface and wall moves relatively to toward or away from the other of the surface and wall.

The deforming means broadly provides a means or mechanism for translating a mechanical displacement into elastic deformation of the movable one of the surface and wall relative to the other. This may include a device for applying a line- or area-distributed compressive load, a tensile force, a torsional twist, or may include a fluidic device for causing the mechanical displacement as a result of an inflation or deflation. Other types of mechanical and fluidic inputs may be used to cause the orifice-varying motion.

To vary the area of the orifice, the wall may move toward or away from the object, the object surface may move toward or away from the wall, or both members may move relatively toward or away from one another.

Accordingly, the general object of the invention is to provide a device for providing a variable orifice.

Another object is to provide a device affording the capability of a variable orifice, the open area of which changes in response to a supplied mechanical displacement producing stress causing elastic deformation.

Still another object is to provide an improved device for providing a variable orifice, in which the area of the orifice varies substantially proportionally as the supplied mechanical displacement.

These and other objects and advantages will become apparent from the foregoing and ongoing written specification, the drawings, and the appended claims.

BRIEF DESCRIPTION OF THE DRAWINGS

FIG. 1 is a fragmentary schematic vertical sectional view of a first form of the improved device, this view showing the object as being a spherical ball arranged within the central through-bore of a flanged tube.

FIG. 2 is a fragmentary schematic vertical sectional view thereof, generally similar to FIG. 1, but showing the flanged tube as having been deformed by application of a uniform compressive load around the periphery of the flanges so as to cause flexure or bending of such tube, with concomitant inward bowing of the wall to vary the area of the orifice.

FIG. 3 is fragmentary schematic vertical sectional view of a second form of the improved device, this view again showing the object as being a spherical ball operatively arranged within the central through-bore of a flanged tube.

FIG. 4 is a fragmentary schematic vertical sectional view thereof, generally similar to FIG. 3, but showing the wall of the flanged tube as having bowed radially inwardly toward the object in response to application of a twisting displacement of the tube flanges.

FIG. 5 is a fragmentary schematic vertical sectional view of a third form of the improved device, this view showing the object as being a vertically-elongated cylindrical rod operatively penetrating the central opening of a Belleville-washer-like member.

FIG. 6 is a fragmentary schematic vertical sectional view thereof, generally similar to FIG. 5, but showing the Belleville-washer-like member as having been deformed under application of a compressive displacement to vary the orifice area.

DESCRIPTION OF THE PREFERRED EMBODIMENTS(S)

At the outset, it should be clearly understood that like reference numerals are intended to identify the same structural elements, portions or surfaces consistently throughout the several drawings figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, the present invention broadly provides an improved device for providing a variable-area orifice. In the accompanying drawings, three particular implementations are shown. A first form is shown in FIGS. 1–2, a second in FIGS. 3–4, and a third in FIGS. 5–6. For convenience, these three different forms or implementations will be discussed seriatim herebelow.

First Form (FIGS. 1–2)

FIGS. 1 and 2 schematically illustrate a first form of the improved device. In this form, the improved device, generally indicated at 20, is shown as broadly including an object 21 positioned within the central vertical through-bore of a flanged tube, generally indicated at 22. In this first form, object 21 is a ball having a spherical outer surface. The ball is operatively held in its position by means of a rod, a portion of which is fragmentarily indicated at 23.

The flanged tube 22 is shown as having an inwardly-facing cylindrical surface or wall 24 defining its through-bore, having a thin-walled tubular portion 25, and having upper and lower disk-like flanges 26, 28, respectively, extending radially outwardly from the upper and lower margins of intermediate wall portion 25.

FIG. 1 depicts the object as being positioned within the through-bore, which is elongated along vertical axis y—y. Thus, in the undeformed shape illustrated in FIG. 1, an annular orifice, having a radial clearance $c_1$, is defined between the object and wall.

FIG. 2 shows the tubular wall portion 25 as having been bowed radially inwardly toward the ball in response to application of a uniform peripheral compressive vertical displacement of the outer margins of the upper and lower flanges toward one another, this being caused by force $F_1$. In other words, this displacement produces circumferential moments around the junctures of the flanges and the ends of the tubular section such that the tube wall 24 bows radially inwardly toward ball 21. The effect of this inward bowing of the wall is to reduce the initial clearance $c_1$ to some lesser value, shown to be $c_2$ in FIG. 2. Moreover, since the applied displacement acts around the entire periphery of the upper and lower flanges, the wall bows radially inwardly substantially uniformly about its circumference. Hence, the radial clearance changes substantially uniformly about the ball in response to the elastic deformation of the flanges, as opposed to producing the crescent-shaped openings in the prior art.

Second Form (FIGS. 3–4)

FIGS. 3 and 4 show a second form of the improved device, generally indicated at 30.

In this second form, the object 21 is also shown as being a ball, as previously described. The device is again shown as including a flanged tube, again indicated at 22, having the various parts, portions and surfaces previously described.

The difference in this second form is that a pure twist, indicated at T, is applied to the upper and lower flanges, the direction of this twist being symbolically shown in FIG. 4. Such twisting of the flanges causes a concomitant inward bowing of wall 24. Thus, whereas FIG. 3 shows the unbiased shape, and the orifice as having a radial clearance of $c_1$, when the twist is applied to the tubular section, the radial clearance is reduced to some smaller value, shown to be $c_2$ in FIG. 4, due to the inward bowing of the wall.

Third Form (FIGS. 5–6)

FIGS. 5 and 6 show a third form of the improved device. In this form, the device, now generally indicated at 40, is shown as having an object in the form of a vertically-elongated cylindrical rod 41, operatively penetrating the central opening of a Belleville-spring-like washer pair, generally indicated at 42. The washer-like flanges are formed integrally with a short intermediate tubular section so that they may be deformed as a unit.

In this form, a uniformly-distributed compressive vertical displacement ($F_3$) of the upper and lower outer marginal edges of the flanges, tending to flatten the "Belleville washer stack", as shown in FIG. 6, will cause torsional deformation of the washer-like members such that the inner diameter will be reduced and the radial clearance will change from an initial value $c_1$ in FIG. 5 to a smaller value $c_2$ in FIG. 6.

Therefore, the present invention broadly provides an improved device for providing a variable-area orifice including an object having an outer surface, a wall surrounding the object in closely spaced relation thereto and defining an orifice opening therebetween, and means for elastically deforming one of the surface and wall in such a way as to cause the affected member to move perpendicularly toward or away from the other of the surface and wall so as to uniformly change the spacing therebetween without substantially altering the initial geometric shape of the orifice opening.

Modifications

The present invention contemplates that many changes and modifications may be made.

In the accompanying drawings, the object has been shown as being in the forms of a spherical ball and a cylindrical rod. The object could have other forms as well. It is presently preferred that the object have an outer surface that is configured as a surface of revolution. Thus, the object may be in the form of many different shapes and configurations.

In the first two forms, the wall has been schematically provided on a flanged tube. This simply provides a readily understandable form in which application of various mechanical displacements will produce the desired movement of the tubular wall either toward or away from the object. However, the wall portion need not necessarily be tubular. For example, the equivalent of a wall may be provided as the edge of the inner circular opening of a Belleville-spring-like member, as shown in FIGS. 5–6, or on some differently-configured member as well.

It should also be noted that at least one of the wall and object must move relative toward the other to vary the area of the orifice. In an appropriate case, the peripheral surface of the object might move toward and away from a fixed-diameter wall, as, for example, by selective inflation and deflation of the fluid pressure within a hollow elastically-deformable ball. Alternatively, the object may move relative to a fixed wall, or the wall and the object may both move relatively toward and away from one another.

The materials of construction may also be changed, as desired. For example, while the various tubular members and the Belleville washer member are crossed-hatched as being metal, they could alternatively be formed of a suitable plastic or elastomeric material, or some other material, as desired. In still other forms and embodiments, the orifice-changing deformation may be provided by a compressive or tensile load distributed over a larger area.

Therefore, while several forms of the improved device have been shown and described, and several modifications thereof discussed, persons skilled in this art will readily appreciate the various additional changes and modifications may be made without departing from the spirit of the invention, as defined and differentiated by the following claims.

What is claimed is:

1. A device for providing a variable orifice, comprising:

an object having an outer surface symmetrical about an axis, a circular line on said surface being perpendicular to said axis;

a member having a tubular portion generated about said axis and arranged in closely-spaced facing relation to said line to define an annular orifice therebetween, and having at least one flange portion extending away from a marginal end portion of said tubular portion;

means for applying a force to said flange portion at a location spaced radially outwardly from said tubular portion to develop at least one of (a) a circumferential moment tending to roll the marginal end portion of said tubular portion inwardly or outwardly, and (b) a radial force tending to compress or expand the marginal end portion of said tubular portion inwardly or outwardly, so as to selectively vary the radial size of said orifice;

whereby the radial size of said orifice may be varied as a function of said force.

2. A device as set forth in claim 1 wherein the force applied to said flange portion is distributed uniformly within an annulus generated about said axis.

3. A device as set forth in claim 1 wherein said moment is substantially continuous about the circumference of said marginal end portion.

4. A device as set forth in claim 1 wherein said member has a flange portion extending away from each marginal end portion of said tubular portion.

5. A device as set forth in claim 1 wherein a surface on said flange portion extends away from the associated marginal end portion of said tubular portion in a plane perpendicular to said axis.

6. A device as set forth in claim 1 wherein a surface on said flange portion extends away from the associated marginal end portion of said tubular portion as a cone generated about said axis.

7. A device as set forth in claim 1 wherein said means causes a mechanical displacement of said flange portion and an elastic deformation of said tubular portion.

8. A device as set forth in claim 1 wherein the radial size of said annular orifice varies proportionally to the amount of said flange portion displacement.

9. A device as set forth in claim 1 wherein the radial size of said annular orifice varies uniformly about its circumference in response to the force applied to said flange portion.

* * * * *